(12) United States Patent
Perko et al.

(10) Patent No.: US 6,623,174 B2
(45) Date of Patent: Sep. 23, 2003

(54) OPTICAL CONNECTOR

(75) Inventors: Richard J. Perko, Harrisburg, PA (US); Terry P. Bowen, Etters, PA (US); Ping Peng, Mechanicsburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/976,261

(22) Filed: Oct. 12, 2001

(65) Prior Publication Data

US 2002/0181890 A1 Dec. 5, 2002

Related U.S. Application Data

(60) Provisional application No. 60/240,445, filed on Oct. 12, 2000.

(51) Int. Cl.[7] ................................................. G02B 6/36
(52) U.S. Cl. ...................................................... 385/78
(58) Field of Search ............................. 385/76, 77, 78, 385/80, 85, 138, 38

(56) References Cited

U.S. PATENT DOCUMENTS

| 4,212,514 A | 7/1980 | Prunier et al. ............ 350/96.21 |
| 4,255,016 A | 3/1981 | Borsuk ...................... 350/96.21 |
| 4,512,630 A | 4/1985 | Tillotson .................. 350/96.21 |
| 4,666,236 A | 5/1987 | Mikami et al. ........... 350/96.15 |
| 4,709,981 A | 12/1987 | Mori ........................ 350/96.21 |
| 4,717,234 A | 1/1988 | Barlow et al. ............ 350/96.21 |
| 4,725,117 A | 2/1988 | Ellis ............................ 350/96.2 |
| 4,900,124 A | 2/1990 | Lampert et al. .......... 350/96.21 |
| 4,991,929 A | 2/1991 | Bowen et al. |
| 5,082,345 A | 1/1992 | Cammons et al. ............. 385/60 |
| 5,134,676 A | 7/1992 | Boillot et al. ................. 385/72 |
| 5,208,886 A * | 5/1993 | Clayton et al. ............... 385/73 |
| 5,381,495 A | 1/1995 | Hu ................................ 385/51 |
| 5,452,386 A | 9/1995 | van Woesik ................. 385/72 |
| 5,463,709 A * | 10/1995 | Terao et al. ................... 385/85 |
| 5,515,464 A | 5/1996 | Sheen ........................... 385/49 |
| 5,550,944 A | 8/1996 | van Woesik et al. .......... 385/73 |
| 5,631,986 A * | 5/1997 | Frey et al. ..................... 385/78 |
| 5,706,379 A * | 1/1998 | Serafini et al. ............... 385/75 |
| 6,081,632 A | 6/2000 | Yoshimura et al. ............ 385/5 |
| 6,097,873 A | 8/2000 | Filas et al. ................... 385/140 |
| 6,139,194 A | 10/2000 | Bella et al. .................... 385/73 |
| 6,179,480 B1 | 1/2001 | Bella et al. .................... 385/76 |
| 6,203,208 B1 | 3/2001 | Stupar .......................... 385/73 |
| 6,220,763 B1 | 4/2001 | Samela et al. ................ 385/73 |
| 6,280,099 B1 * | 8/2001 | Wu ............................... 385/73 |
| 6,393,182 B1 * | 5/2002 | Sakano ......................... 385/38 |

* cited by examiner

*Primary Examiner*—Lynn Feild
*Assistant Examiner*—Thanh-Tam Le

(57) ABSTRACT

The present invention provides an optical connector comprising a ferrule having an unpolished mating face and defining a fiber bore, at least one fiber contained within the ferrule such that an end face of the fiber is presented at said mating face, and a film having an outer surface, the film being disposed on the ferrule mating face such that any air gap between the outer surface of the film and the end face of the fiber is essentially eliminated, and the outer surface being suitable for mating with a mating structure such that the fiber is optically coupled with a mating optical pathway in a mating structure.

20 Claims, 1 Drawing Sheet

OPTICAL CONNECTOR

RELATED APPLICATION

The present application claims priority to Provisional Application No. 60/240,445, filed Oct. 12, 2000, and hereby incorporated by reference.

FIELD OF INVENTION

The present invention relates generally to optical connector, and, more specifically, to an connector having a ferrule.

BACKGROUND OF THE INVENTION

Optical connectors find use in a wide variety of applications, for example, in telecommunication networks, as vehicles for facilitating the optical coupling of fibers. Many conventional connectors facilitate such coupling by bringing the ends of fibers to be coupled into direct physical contact.

To effect such direct contact, however, conventional connectors typically require polished ferrules. Unpolished ferrules have a geometry on their mating face which make it difficult, if not impossible, to bring the end faces of fibers housed therein into physical contact with the end faces of mating fibers. In addition, when multiple fibers are affixed to an unpolished ferrule, the positions of the fiber ends tend to vary along the mating axis, thereby making it difficult to effect optical coupling with all of the fibers. Polishing the mating face tends to overcome these problems and provide sufficient optical coupling of fibers housed therein. Furthermore, to enhance optical coupling, gels may be used to coat the mating face of the ferrules and eliminate air gaps between the ferrules. Unfortunately, polishing connectors tends to be time consuming and costly, and gels are messy and tend to accumulate dust and dirt.

Therefore, there is a need to effect optical couplings while avoiding the above-mentioned problems. The present invention fulfills this need among others.

SUMMARY OF THE INVENTION

The present invention overcomes the problems of the prior art by applying a compliant film to the mating face of a connector ferrule to provide a gap-filling medium through which the fibers may be optically coupled to mating optical pathways. The applied film provides an outer surface having a geometry suitable for mating with a wide range of mating surfaces. The film also accommodates for anomalies present on the ferrule mating face and fills the gaps between the end faces of the fibers and the outer surface of the film. Accordingly, the present invention provides an optical connector which allows unpolished ferrules to be mated without sacrificing optical performance.

One aspect of the present invention is an optical connector comprising a ferrule having an unpolished mating face and defining a fiber bore, at least one fiber contained within the ferrule such that an end face of the fiber is presented at said mating face, and a film having an outer surface, the film being disposed on the ferrule mating face such that any air gap between the outer surface of the film and the end face of the fiber is essentially eliminated, and the outer surface being suitable for mating with a mating structure such that the fiber is optically coupled with a mating optical pathway in a mating structure.

Another aspect is a mated assembly comprising an optical connector comprising a ferrule having an unpolished mating face and defining a fiber bore, at least one fiber contained within the ferrule such that an end face of the fiber is presented at said mating face, and a film having an outer surface, the film being disposed on the ferrule mating face such that any air gap between the outer surface of the film and the end face of the fiber is essentially eliminated, the outer surface being suitable for mating with a mating structure such that the fiber is optically coupled with a mating optical pathway in a mating structure, and a mating structure comprising at least a second mating face presenting an end of at least one optical pathway therein, the at least one fiber and said at least one wave guide being optically coupled.

Yet another aspect is a method for producing an optical connector comprising providing a ferrule having an unpolished mating face and defining a fiber bore providing a compliant film having an outer surface, and applying the compliant film to the mating face of the ferrule such that the film accommodates one or more features of an unpolished ferrule while the outer surface remains suitable for mating with a mating structure

BRIEF DESCRIPTION OF DRAWINGS

The invention will be further explained with reference to the drawings, wherein.

DETAILED DESCRIPTION OF PREFERRED EMBODIMENTS

Figure 1:
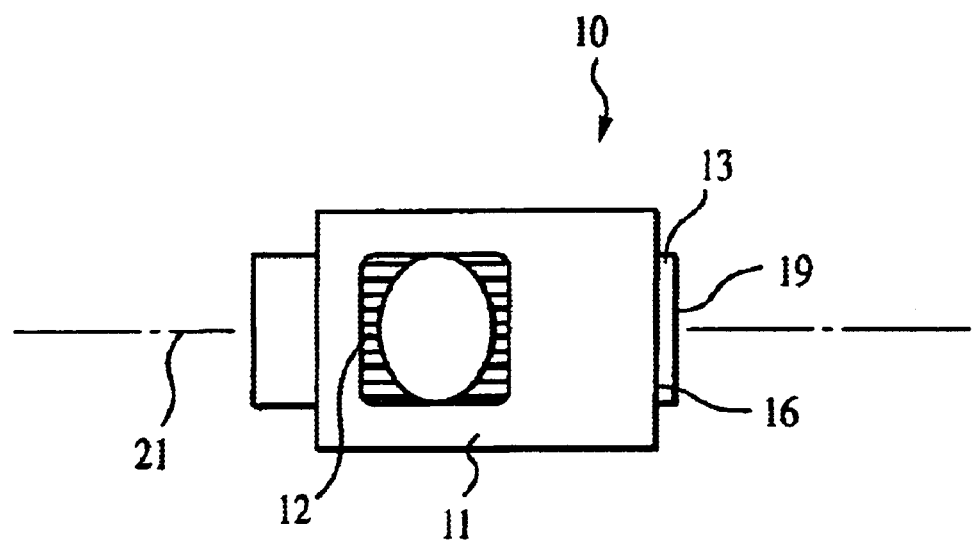
FIG. 1 shows a preferred embodiment of the optical connector of the present invention.

FIG. 1 shows a connector according to a preferred embodiment of the present invention. As shown, the connector 10 comprises a ferrule 11 having an unpolished mating face 16 and defining at least one bore. The bore contains or is suitable for receiving at least one fiber 12 such that an end face (not shown) of the fiber is presented at the unpolished mating face 16. A film 13 having an outer surface 19 is applied to the unpolished mating face such that any air gap between the film and the end face of the fiber is essentially eliminated. The outer surface 19 of the film has a geometry which is suitable for mating with a mating surface of a mating structure such that the fiber is optically coupled to an optical pathway within the mating structure.

The term "optical pathway" as used herein refers to any medium for conducting optical signals including the following: a fiber or waveguide; a silica or polymeric structure in a substrate; or a silica or polymeric optical component. The term "mating structure" refers to an optical package that contains or comprises the optical pathway. For example, a mating structure may be another connector, herein a "mating connector" or it may be an optical package in which the mating optical pathway is an integral component (e.g, passive devices, such as, add/drop filters, arrayed wave guide gratings (AWGs), splitters/couplers, and attenuators, and active devices, such as, optical amplifiers, transmitters, receivers and transceivers). A mating structure typically comprises a mating surface which is adapted to receive the mating face of the ferrule to optically couple the fiber(s) with the mating optical pathway(s). Such mating surfaces are well known in the art.

An important aspect of the present invention is the use of a film to accommodate the anomalies associated with/ present on the mating face of an unpolished ferruled connector and to provide the connector with a smooth surface which is suitable for mating with the mating surface of the mating structure and optically coupling the fiber(s) of the connector with the mating optical pathway(s). Since the connector of the present invention does not require a polished ferrule, in a preferred embodiment, the ferrule is unpolished to realize significant costs savings. An unpolished ferrule typically has one or more characteristics as described below which would prevent the fiber(s) contained in ferrule from optically coupling with the mating optical pathway(s) if not for the compliant film.

An unpolished ferrule typically has variations in its end face which tend to interfere with the mating surface of the mating connector or device and prevent end faces of fibers from making physical contact with mating optical pathways. For example, ridges or bumps on the mating face of an unpolished ferrule prevent the mating face from making good physical contact with a perfectly planar surface. Those skilled in the art will understand that these surface anomalies tend to make physical contact in the center of the mating face most difficult, which is particularly problematic since the center of the ferrule is typically where the fibers are located. Obviously, as the mating face of the ferrule becomes larger in area, as with MT ferrules, the probability of surface variations and imperfections increases along with the number of fibers requiring physical contact. To overcome these surface anomalies, it is common to polish the ferrule such that there are no bumps or ridges on the mating face. Generally, for an MT connector, the surface irregularities are removed during polishing such that the maximum gap between the mating face of the ferrule and a perfectly flat plane is less than about 0.25 $\mu$m. In contrast, an unpolished ferrule may have a gap between its mating face and a perfectly flat plane of greater than about 2.5 $\mu$m. Another approach for mitigating the effects of surface anomalies on the mating face is to polish a dome on the mating face such that the fibers are located at the apex of the dome. This guarantees that the end faces of the fibers are on the leading surface on the mating face along the mating axis, and, thus, any anomalies toward the edges of the ferrule will not prevent the fibers from contacting the mating surface. (Referring to the figures, the mating axis 21 is the axis upon which the end face of the ferrule moves to effect mating/unmating). Obviously, an unpolished ferrule has no dome.

Another characteristic of an unpolished multi-fiber ferrule is a variation among the fibers' end faces with respect to their position along the mating axis of the connector. If the end faces are at different positions along the mating axis, they are prevented from simultaneously making physical contact with mating waveguides. Polishing a connector ensures that the end faces are positioned similarly along the mating axis. According to U.S. Pat. No. 5,743,785, in a polished MT ferrule, the end face variation or "delta" of the fibers along the mating axis should be not greater than about 0.4,m and preferably not greater than about 0.2 $\mu$m. Therefore, in an unpolished MT ferrule, the end face delta will typically be greater than 0.4 $\mu$m.

Polishing the ferrule not only levels the fiber end faces with respect to each other, but also causes the fiber end faces to protrude a certain distance from the ferrule's mating face. This is due to the fact that MT ferrules typically comprise a polymer material which tends to abrade more quickly than the fibers during polishing. As the ferrule material abrades around the fibers, the fibers effectively protrude from the mating face. Such a protrusion increases the likelihood of the fiber end faces making physical contact with the mating optical pathway of a mating structure. According to U.S. Pat. No. 5,743,785, in a polished ferrule, the ends of the fiber should protrude from the ferrule's mating face by about 0.5 to about 2.5 $\mu$m, or, in other terms, from about 0.4 to about 2% of the fibers diameter. Therefore, with an unpolished ferrule, the fiber protrudes by less than 0.5 $\mu$m or by greater than 2.5 $\mu$m from the ferrule's mating face, or by less than 0.4% or by greater than 2% of the fiber's diameter.

Therefore, as used herein, the term "unpolished ferrule" refers to a ferrule having one or more of the following features: (1) a gap of greater than about 2.5 $\mu$m between the mating face of the ferrule and a perfectly planar surface, (2) a mating face which is not domed, (2) a fiber end face delta of greater than 0.4 $\mu$m, and (4) a fiber protrusion of less than 0.5 $\mu$m or greater than 2.5 $\mu$m from the ferrule's mating face, or less than 0.4% or greater than 2% of the fiber's diameter In samples of 100 or more connectors of the present invention, at least 90% have one or more of these characteristics and at least 70% have two or more of these features.

Without precise optical polishing or the application of the compliant film, these features would negatively affect optical coupling of the connector by undermining the physical contact between the fiber end face and the mating waveguide and thus increase Fresnel losses. However, when the compliant film is applied to the unpolished ferrule, the film minimizes the negative effects of the unpolished characteristics. Specifically, with the compliant film on the mating face of the ferrule, the surface anomalies on the mating face, which otherwise would prevent the fiber end faces from making physical contact, are "absorbed" or accommodated by the film. The fiber end face delta too is of less significance since the film is applied to the mating face such that it fills in the gaps between end faces along the mating axis. It has been found that the connector of the present invention can accommodate a fiber end face delta greater than 0.4 $\mu$m and up to about 2.5 $\mu$m. Finally, the need for the fiber to protrude from the ferrule is minimized since physical contact between the fiber end faces and the mating optical pathway is no longer direct-optical coupling between the fiber and mating optical pathway is effected across the film. It has been found that the connector of the present invention can accommodate a fiber protrusion from about –0.5 (i.e., below the surface of the mating face) to about 3 $\mu$m from the mating face of the ferrule. Preferably, the end face protrusion is about 1 to about 3 $\mu$m from the mating face. through which the present ferruled connector may be optically coupled with another connector. Since it is desirable to effect a low-loss coupling between fibers, the present film should exhibit optical properties to allow coupling with minimal loss.

Since the film acts as a gap filler between the fiber end faces and the mating waveguide to eliminate or reduce air gaps so that Fresnel losses are minimized, it is preferable that the film be sufficiently compliant. Thus, at a minimum, the film should have an elongation at break of greater than 50%.

Aside from being compliant, the film needs to be sufficiently tough such that it is not easily punctured by the fibers or damaged when handling during installation or after installation by debris. Accordingly, in a preferred embodiment, the film has a tensile strength of greater than 100 N/mm$^2$.

The thickness of the film for use in any application according to the present invention should be selected to optimize a number of competing factors including, for example, the optical loss across the film and the tensile strength of the film. In general, the thinner the film, the lower the transmissive loss exhibited across it. However, also as noted above, the film should also be sufficiently thick to ensure the film will not be punctured through by the fibers. According to certain preferred embodiments, the film of the present invention has a thickness of from about 5 micrometers to about 25 µm. Preferably, the thickness is from about 5 µm to about 25 µm, and more preferably from about 5 µm to about 12 µm.

To facilitate optical coupling, since it is desirable to effect a low-loss coupling between fibers, the present film should exhibit properties to allow coupling with minimal optical loss and minimal optical reflection. To this end, it is preferred that the compliant film have an optical index of refraction that is relatively close to the optical index of refraction of the fiber or fibers housed in the present connector. According to certain embodiments, the optical index of the compliant film should differ from the optical index of the multi-mode optical fibers by no more than about ±10% based on the optical index of the fiber. More preferably, the optical index differs by no more than 3%, and, even more preferably, no more than 2% of the optical index of the fiber. For certain single-mode embodiments, it is preferred that the optical index of the film differ by no more than 5% based on the optical index of the fiber, more preferably, by no more than 1%, and, even more preferably, no more than 0.5%.

According to certain embodiments, the present film may have an optical index of from about 1.35 to about 1.63. As those of skill in the art will recognize, the range of desirable optical indexes will differ, at least slightly, depending on whether the fibers housed in the connector are multi-mode or single-mode fibers. According to certain multi-mode embodiments, the film of the present invention has an optical index of from about 1.35 to about 1.63. Preferably, the optical index of the film is from about 1.44 to about 1.53, and even more preferably, from about 1.46 to about 1.51. According to certain single-mode embodiments, the film of the present invention has an optical index of from about 1.40 to about 1.54. Preferably, the optical index of the film is from about 1.45 to about 1.50, and even more preferably, from about 1.46 to about 1.475.

Any of a wide range of materials capable of producing a film having the aforementioned properties can be used according to the present invention. Examples of suitable materials include polyalkylenes, such as, for example, polypropylene, as well as, polyimides, fluorinated polyimides, polyesters, nylons, and the like. According to certain preferred embodiments, the film of the present invention is a polypropylene film since it is transparent to the wavelengths typically used in optical communication, i.e., 850 to 1630 nm.

The thickness of the film for use in any application according to the present invention should be selected to optimize a number of competing factors including, for example, the loss across the film and the strength of the film. As noted above, it is preferable for the film to allow the optical coupling of at least two fibers with minimal loss therethrough. In general, the thinner the film, the lower the transmissive loss exhibited across it. However, also as noted above, the film should also be of a strength sufficient to ensure the film will not be punctured. According to certain preferred embodiments, the film of the present invention has a thickness of from about 5 micrometers to about 25 micrometers. Preferably, the thickness is from about 5 micrometers to about 25 micrometers, and more preferably from about 5 micrometers to about 12 micrometers. In light of the desirable properties described above, those of skill in the art will be readily able to select films of appropriate thickness for use in the present invention without undue experimentation. the connector for any particular application. The present films tend to be relatively manageable, and thus, can be cut or stamped using any of a wide variety of known processes. A variety of the aforementioned suitable materials are available commercially, including, for example, Kopa AC polypropylene film (available commercially from Spezialpapierfabrik Oberschmitten GMBH), Kynar film (available commercially from Avery Dennison), polyester films (available commercially from DuPont), and Dartek Nylon film (available commercially from DuPont).

The size and shape of the present films should be selected to fit the end face of the ferrule such that it covers the fibers but does not extend excessively past the sides of the ferrule. Accordingly, the physical dimensions of the film will depend in large part on the connector type and ferrule used therein.

The present invention can be practiced with any conventional ferrule connector in either single mode or multi-mode applications. Indeed, this is an important advantage of the present invention as no modification to existing connector designs is needed to implement the thin film and save the cost and time of polishing the ferrule. As mentioned above, the invention is particularly well suited for multi-fiber ferrules since they tend to be more difficult to polish. Preferably, the multi-fiber ferrule connector may be an MT-type connector for example, the Lightray MPX connector, the MTO connector. Aside from multi-fiber ferrule connectors, the present invention may be practiced with single ferrule connectors, such as the MU, LC, ST, FC, and SC connectors. The invention is also particularly well suited for field-installable connectors. As used herein, the term "field-installable connector" refers generally to any optical connector that is at least partially assembled on-site, that is, at the site where the connector is to be used for a particular connecting application. Examples of field-installable connectors include AMP LightCrimp Plus SC Connector Kits 492643-1 and 1278079-1, and Duplex Connector Kits 1278009-1 and 1278080-1.

By practicing the present invention, the fiber in an unpolished ferrule can be optically coupled with a mating waveguide with unprecedented performance. In a preferred embodiment, when a multimode connector of the present invention is mated to a mating structure, the insertion loss is less than 0.75 dB and preferably less than 0.3 dB, and the back reflection at the coupling is less than −20 dB, preferably less than −30 dB, and more preferably −35 dB. In a single-mode connector of the present invention, the insertion loss is less than 0.5 dB and preferably less than 0.3 dB, and the back reflection at the coupling is less than −26 dB, preferably less than −30 dB, and more preferably less than −35 dB. Aside from optical performance, it has been found that the connector of the present invention is durable and can withstand more than 500 mating and unmating cycles.

The connector described above can be prepared using known techniques and existing materials. Generally, the method involves providing a ferrule having a mating face which is unpolished, providing a compliant film having an inner surface and an outer surface, and applying the inner surface of the compliant film to the mating face of the ferrule while the outer surface remains suitable for forming an optical connection with a mating connector.

According to certain embodiments, the ferrules of the present method are provided as they are received from a commercial source, or manufactured, without polishing. Although the ferrules typically are polished, according to certain preferred embodiments, the ferrules may be slightly modified. As used herein the term "slightly modified" refers generally to ferrules that are treated in such a manner that they differ somewhat from the form they are received from a commercial source or manufactured, but are not polished. Examples of slight modifications include removing molding burr from the ferrule and cleaning the ferrule to facilitate application of film. In certain preferred embodiments, the ferrules of the present invention are ultrasonically cleaned with isopropanol and dried.

As will be discussed in more detail below, any one or more optical fibers intended to be housed in the connector can be inserted into a ferrule of the present invention either before or after a compliant film has been applied using known techniques. Accordingly, the ferrules involved in the ferrule-providing step may or may not have at least one fiber already disposed therein.

The step of providing a compliant film generally involves providing any film of the present invention as described above. The size and shape of the provided films may be selected to fit the connector for any particular application. The present films tend to be relatively manageable, and many are available commercially or manufactured as a sheet or tape. Accordingly, the present films can be cut or stamped using any of a wide variety of known processes.

According to certain preferred embodiments the film of the present invention is stamped or cut from a sheet having a peelable layer. In such embodiments, the film may be applied to a ferrule prior to, or after removing the peelable layer. When applied prior to removing the peelable layer, the side without peelable layer is preferably the inner surface, (i.e., the surface that faces the ferrule).

The films of the present invention may also have guide holes punched into them to provide a means of alignment of the film on the face of the ferrule. The guide holes can be punched, either simultaneously or separately from any cutting or stamping of the film, using any of the above methods. For example, the compliant film may have guide holes for use in aligning film onto the unpolished mating face of a ferrule.

The providing step of the present invention may further comprise treating the films prior to applying them to a ferrule. Any of a wide range of treating steps known in the art may be used according to the present invention. Examples of suitable treatments include cleaning the surfaces of the film, such as via ultrasound or with solvents (i.e. isopropanol), priming the surfaces, effecting Corona treatment of the film, and combinations of two or more thereof.

The applying step generally involves applying a film of the present invention to the mating face of a provided ferrule to accommodate one or more features of an unpolished ferrule and to provide a smooth surface for coupling with a mating connector. According to certain embodiments, the applying step of the present invention comprises the steps of positioning the film relative to the mating face of the ferrule and adhering the film to the mating face.

As noted above, the film of the present invention may be applied to a ferrule in which fibers are already housed or to a ferrule which houses no fibers, but into which fibers will be inserted subsequently. In embodiments wherein the ferrule contains at least one fiber, the film is positioned relative to and is adhered to both the mating face of the ferrule and the fibers housed therein. In embodiments wherein the ferrule houses no fibers, the film is positioned relative to and is adhered to the ferrule mating face and adjacent the fiber bore(s) located therein.

According to certain embodiments, the film of the present invention is positioned such that upon adhering the film to the mating face, any anomalies located on the mating face and any air gaps located between the ends of any fibers and the outer surface of the film are essentially eliminated. Preferably, the film is positioned such that the film covers all of the fibers or fiber bores located on the mating face. Any of a wide range of methods for positioning the film relative to the mating face of the ferrule can be used according to the present invention. Preferably, as mentioned above, the film has alignment holes therein to effect alignment with corresponding pins on the ferrule.

Any of a wide range of methods for adhering the film to the mating face of the ferrule can be used according to the present invention. According to certain embodiments, the film is adhered to the mating face by providing an adhesive/gap filler layer between the inner surface of the film and the mating face of the ferrule. In such embodiments, the adhesive/gap filler serves not only to adhere the film to the ferrule mating face, but also to help accommodate mating-face anomalies by filling in air gaps between the fiber end faces and the outer surface of the film. Accordingly, it is preferred that the adhesive have an optical index that is relatively close to the optical index of the fiber or fibers housed in the ferrule.

Figure 2:
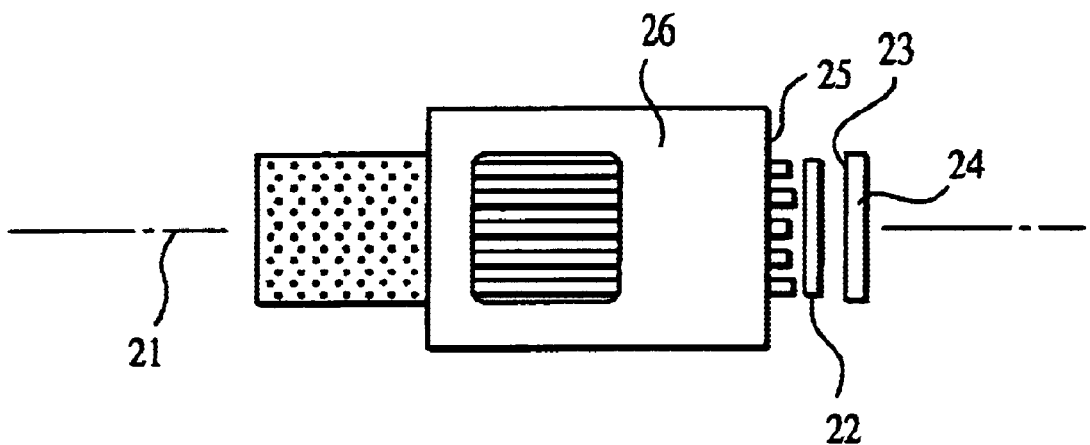
FIG. 2 is a schematic diagram of preparing the optical connector of FIG. 1.

Referring to FIG. 2, a schematic of adhering the film of the present invention to the mating face of a ferrule is shown. As shown, adhesive layer 27 is positioned between the inner surface 28 of a film 24 and the mating face 25 of ferrule 26 to adhere inner surface 28 to mating face 25. Adhesive layer 27 may be applied to either or both of mating face 25 and inner surface 28 prior to the adhering step. As illustrated in FIG. 2, any fiber end faces presented through mating face 25 are also adhered to inner surface 28.

Any of a wide range of adhesives may be used according to the present invention. Examples of suitable adhesives include epoxies, acrylic adhesives, and the like. The adhesives may be curable via ultraviolet (UV) light, heat, or both. A number of UV/heat curable adhesives are available commercially, including: Epotek OG142-13, OG146, and UV0114 (available commercially from Epoxy Technology), OPTOCAST 3553, HM and UTF (available commercially from Electronic Materials Inc.)

According to certain other embodiments, the applying step comprises treating the film such that the inner surface has a fluid tendency which allows it to flow into the gaps between the film and the mating face of the ferrule. Suitable film treatments include, for example, heating the film, chemically reacting one or more components of the film, and applying high pressure to the film. Heating is a preferred treatment. As is well known, when sufficient heat is applied to a film of the present invention, the film tends to liquify slightly and flow, and when the heat is removed it solidifies. Any of a wide range of heat sources can be used to apply heat to the film according to the present invention. Suitable heat sources include, for example, laser welders, torches, and heat guns. In certain preferred embodiments, the heat source is a laser welder.

Advantages associated with the ferrule/film without fiber is the ability to apply the connector in the field without polishing. For example, a connector according to the present invention can be made by adhering a film to a ceramic ferrule, inserting a fiber into the ferrule, and then using a crimp mechanism to bias the fiber forward and present the fiber to the film-ferrule interface. Accordingly, the method of the present invention may further comprise the step of inserting at least one fiber into the ferrule such that the fiber is presented to the ferrule bore/film interface. Preferably, the user presses the fiber against the film to ensure physical contact therewith but not to the extent of causing the fiber to rupture the film.

What is claimed is:

1. An optical connector comprising:
   a ferrule having an unpolished mating face and defining a fiber bore;
   at least one fiber contained within said ferrule such that an end face of the fiber is presented at said mating face; and
   a compliant film having an inner surface and an outer surface, said film being disposed on said mating face such that any air gap between the inner surface of the film and the end face of the fiber is essentially eliminated, said outer surface being suitable for mating with a mating surface of a mating structure such that said fiber is optically coupled with a mating optical pathway in said mating structure.

2. The connector according to claim 1 wherein said film has an elongation at break of greater than 50%.

3. The connector according to claim 2 wherein said film has a tensile strength of greater than 100 N/m$^2$.

4. The connector according to claim 1 wherein said film has a thickness of from about 5 μm to about 25 μm.

5. The connector according to claim 1 wherein the optical index of the film differs from the optical index of the at least one fiber by no more than about ±10%.

6. The connector according to claim 1 wherein the optical index of the film differs from the optical index of the at least one fiber by no more than about ±3%.

7. The connector according to claim 6 wherein the optical index of the film is from about 1.35 to about 1.63.

8. The connector according to claim 6 wherein the optical index of the film is from about 1.40 to about 1.54.

9. The connector according to claim 1 wherein said film is a polypropylene film.

10. The connector according to claim 1 wherein said ferrule is a multi-fiber ferrule.

11. The connector according to claim 10 wherein said ferrule is an MT ferrule.

12. The connector according to claim 1, where said connector further comprises a crimping mechanism to hold said fiber in said ferrule.

13. A mated assembly comprising:
    a connector comprising at least:
    a ferrule having an unpolished mating face and defining a fiber bore;
    at least one fiber contained within said ferrule such that an end face of the fiber is presented at said mating face; and
    a compliant film having an inner surface and an outer surface, said film being disposed on said mating face such that any air gap between the inner surface of the film and the end face of the fiber is essentially eliminated, said outer surface being suitable for mating with a mating structure such that said fiber is optically coupled with a mating optical pathway in said mating structure; and
    a mating structure comprising at least a second mating face presenting an end of at least one optical wave path therein, said at least one fiber and said at least one wave path being optically coupled.

14. The assembly according to claim 13 having an insertion loss of less than 0.3 dB.

15. The assembly according to claim 14 having a back reflection of less than −30 dB.

16. A method for producing an optical connector comprising:
    providing a ferrule having an unpolished mating face and defining a fiber bore;
    providing a compliant film having an outer surface; and
    applying said compliant film to said mating face of said ferrule such that air gaps between said film and said mating face are essentially eliminated, said outer surface being suitable for mating with a mating structure.

17. The method of claim 16 wherein said ferrule has at least one fiber housed therein.

18. The method of claim 17 wherein said applying step comprises positioning said film relative to said mating face and said at least one fiber and adhering said film to said mating face and said at least one fiber.

19. The method of claim 16 wherein an adhesive gel is used to adhere said film to said mating face and to fill in gaps between said fiber and said film.

20. The method of claim 16, further comprising:
    inserting a fiber into said ferrule such that said fiber contacts said film.

* * * * *